US006983283B2

(12) United States Patent
Sowizral et al.

(10) Patent No.: US 6,983,283 B2
(45) Date of Patent: Jan. 3, 2006

(54) MANAGING SCENE GRAPH MEMORY USING DATA STAGING

(75) Inventors: Henry Sowizral, Bellevue, WA (US); Karel Zikan, Seattle, WA (US); Randall Keller, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 524 days.

(21) Appl. No.: 09/970,080

(22) Filed: Oct. 3, 2001

(65) Prior Publication Data

US 2003/0065668 A1 Apr. 3, 2003

(51) Int. Cl.
*G06F 17/30* (2006.01)

(52) U.S. Cl. .............. 707/102; 707/103 Z; 707/104.1; 345/440

(58) Field of Classification Search .............. 707/102, 707/103 Z, 104.1, 104, 200; 345/440
See application file for complete search history.

(56) References Cited

U.S. PATENT DOCUMENTS

| | | | | | |
|---|---|---|---|---|---|
| 5,577,180 | A | * | 11/1996 | Reed | 345/634 |
| 5,764,241 | A | * | 6/1998 | Elliott et al. | 345/473 |
| 5,945,992 | A | | 8/1999 | Cunniff | |
| 5,956,039 | A | * | 9/1999 | Woods et al. | 345/419 |
| 5,999,944 | A | | 12/1999 | Lipkin | |
| 6,130,670 | A | | 10/2000 | Porter | |
| 6,137,499 | A | * | 10/2000 | Tesler | 345/440 |
| 6,301,579 | B1 | * | 10/2001 | Becker | 707/102 |
| 6,437,778 | B1 | * | 8/2002 | Matsui et al. | 345/419 |

OTHER PUBLICATIONS

Memory Management; www.cs.wpi.edu, pp. 1–4.*
Kenneth E. Hoff III, ACM Crossroads, "Faster 3D Game Graphics by Not Drawing What Is Not Seen", Jan. 24, 2001; pp. 1–9.*

Tim Farrell, "Programming in Windows 3.1", 2nd Edition, 1992. pp. 428–432.*

Masatoshi Arikawa et al.; "Dynamic LoD for QoS Management in the Next Generation VRML"; Proceedings of the IEEE International Conference on Multimedia Computing and Systems; Los Alamitos, California; Jun. 17, 1999; pp. 24–37.

Lisa Sobierajski Avila and William Schroder; "Interactive Visualization of Aircraft and Power Generation Engines"; IEEE Proceedings Visualization '97; Phoenix, Arizona; Oct. 19, 1997; pp. 483–486.

"The Virtual Reality Modeling Language," International Standard ISO/IEC 14772–1:1997, VRML 97, 1997 (retrieved from the Internet: <URL:http//www.vrml.org/specifications/vrml97>).

International Search Report, Application No. EP 02 25 6897, mailed Jan. 2, 2004.

* cited by examiner

*Primary Examiner*—Frantz Coby
*Assistant Examiner*—Haythim ALaubaidi
(74) *Attorney, Agent, or Firm*—Meyertons Hood Kivlin Kowert & Goetzel, P.C.; Jeffrey C. Hood

(57) ABSTRACT

A system and method that manages scene graphs by data staging is contemplated. Data staging entails selectively loading only the portions of the scene graph that are currently needed or likely to be needed in the near future. Other objects in the scene graph that are not currently needed or likely to be needed may be replaced by pointers. The pointers may point to the location from which the objects may be accessed if necessary for a future frame. The replaced portions of the scene graph may be compressed and/or cached to a local memory device (e.g., a local array of read-write optical drives) capable of storing large amounts of data, with the pointers indicating where the objects are stored.

23 Claims, 6 Drawing Sheets

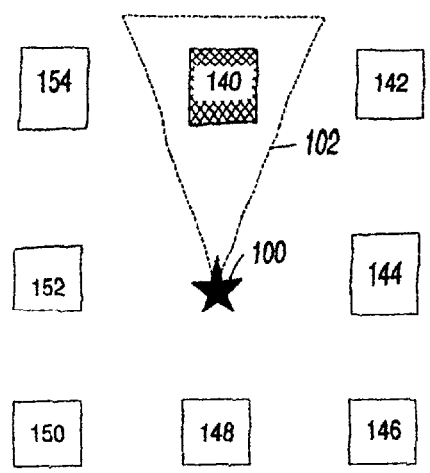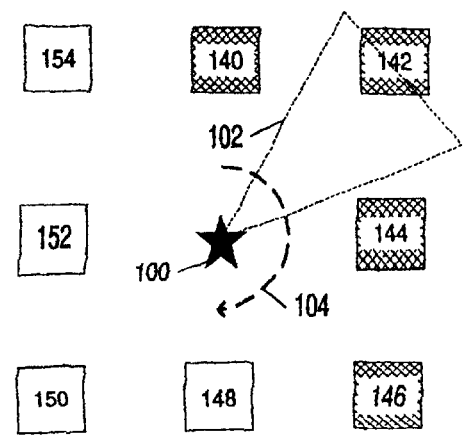
FIG. 7 (TIME=0)     FIG. 8 (TIME=1)

MANAGING SCENE GRAPH MEMORY USING DATA STAGING

BACKGROUND OF THE INVENTION

1. Field of the Invention

The present invention generally relates to computer graphics, and more particularly, to the use and management of scene graphs for computer graphics.

2. Description of the Related Art

A scene graph is a type of data structure. For example, VRML (Virtual Reality Modeling Language) and Java 3D™ both supports scene graphs as data structures. Scene graphs are typically a hierarchical organization of graphics and other data that can be used to create a virtual three-dimensional (3D) world. The scene graph describes the three-dimensional world, including the objects it contains, their properties, and how they interact. In addition to graphics files, other files such as sound files can also be incorporated into a scene graph to add additional elements to the virtual 3D world.

Using the example of a VRML-enabled browser, when a computer user accesses VRML content across a network, the browser automatically downloads the scene graph from the network and stores the scene graph in local memory. The browser then renders the portions of the scene that are visible from the user's current viewpoint (i.e., position and orientation within the virtual world). As the user navigates the virtual world, new objects may become visible while others pass from view.

While this simple technique of loading the scene graph, determining which objects are visible, and then rendering the objects works well for small virtual worlds, it has significant short comings when dealing with larger virtual worlds. Some applications require large virtual worlds with tens of thousands of objects. Currently, some engineering and architectural applications allow users to collaborate to design and view complex scenes such as the interior of a large building or aircraft. Future applications may allow city planner to accurately model large portions of cities. The scene graphs for these applications may be hundreds of gigabytes or more in size. Thus, it may not be practical to wait for the entire scene graph to download across a network before determining which portions of the scene graph are visible and which portions should be rendered. Even using high speed networks, the delay experienced while waiting for the entire scene graph to be downloaded may render such applications impractical. Furthermore, managing such large scene graphs is difficult using current techniques since most computer systems do not have enough memory to store the entire scene graph in memory. Thus, a new system and method for efficiently managing large scene graphs is desired.

SUMMARY OF THE INVENTION

The problems outlined above may at least in part be solved by a system and method that manages scene graphs by data staging. Data staging entails selectively loading only the portions of the scene graph that are currently needed or likely to be needed in the near future. Thus, while a scene graph may represent an entire office building with hundreds of rooms, only the objects in the scene graph that are visible from the particular office that the viewer is currently in (or those immediately surrounding the particular office) need be loaded into local memory. Other objects in the scene graph that are not currently visible (and not currently likely to be visible in the next few frames) may advantageously be replaced by pointers. The pointers may point to the location from which the objects may be accessed if necessary for a future frame. In some embodiments, the replaced objects may be compressed and/or cached to a local memory device (e.g., a local array of read-write optical drives) capable of storing large amounts of data, with the pointers indicating where the objects are stored. In other embodiments, the pointers may point to a particular network location from which the objects may be loaded.

The system and method may be implemented in software, hardware, or a combination thereof. In one embodiment, the method may comprise determining a current location for a viewpoint, and determining a current locality threshold based on at least the current location of the viewpoint. Next, a determination may be made regarding which portions of the scene graph are relevant to the current locality threshold. As used herein, a locality threshold is a region or volume associated with a current viewpoint and/or a predicted future viewpoint. The locality threshold may be used to determine which objects or portions of scene graph are relevant (e.g., are visible or likely to be visible) from the current or future viewpoints. For example, in one embodiment the locality threshold for a viewpoint may be a sphere or circle having a predetermined radius that is centered at the current viewpoint. Preferably, the radius of the sphere or circle is larger than the view horizon for the particular scene. Thus, once the current locality threshold has been determined, and the portions of the scene graph that are relevant to the current locality threshold have been determined, those relevant portions may be loaded into a local memory. Any portions of the scene graph that are not relevant may be replaced with one or more pointers. The pointers may point to locations in memory (e.g., a local or remote data server or hard drive) that is configured to store the non-relevant portions of the scene graph. Advantageously, as the scene graph is traversed, non-relevant portions (which are typically not rendered) may be accessed if necessary by following the pointers. However, relevant portions (which are typically rendered) may be stored locally in memory for rapid access. This method may be particularly advantageous because non-rendered portions of the scene graph (i.e., irrelevant portions) are not typically needed. Thus, a pointer to the location where this information is stored is typically sufficient. The system and method disclosed herein may be applied to both visible and non-visible objects (e.g., sound objects).

In some embodiments, a predicted future locality threshold may also be determined. As noted above, a locality threshold may be used to determine which objects or portions of the scene graph are relevant (and thus likely to be needed or rendered). In some embodiments, however, a predicted future locality threshold may also be used. In this way, management of the scene graph may be predicted (i.e., by looking not only at the current position of the viewpoint but also predicted future positions of the viewpoint). Similarly, portions of the scene graph that are relevant to the predicted future locality threshold may also be loaded into the local memory with the portions of the scene graph that are relevant to the current locality threshold. Furthermore, portions of the scene graph that are not relevant to either (a) the current locality threshold, and (b) the predicted future locality threshold, may be replaced with pointers as specified above.

In some embodiments, a current velocity and/or acceleration for the viewpoint may be determined. The velocity and/or acceleration values may be used to determine the predicted future locality threshold. In some embodiments, the velocity and/or acceleration values may have both translational components and rotational components. For example, a locality threshold may be defined by the visibility frustum associated with the current viewpoint. A visibility frustum is a volume (typically a cone) that represents the volume in unobstructed space that would be visible to a viewer positioned at a particular position in space. While the current viewpoint defines the position of the visibility frustum (i.e., the apex), the determination of which portions of the scene graph are relevant or visible may vary depending upon the orientation of the visibility frustum. Thus, both translational and rotational components, and both velocity and acceleration for each of these components, may be utilized in some embodiments.

In some embodiments, the portions of the scene graph that are replaced by pointers may be cached to local hard drives or networked storage arrays. In other embodiments, the replaced portions of the scene graph may be compressed before being stored to memory, a local hard drive, or a network storage location. Compression may advantageously reduce the amount of memory required to store the scene graph. Since the non-relevant portions are unlikely to be needed immediately, the predicted method described herein may be used to decompress portions as they become relevant thus insuring that they are available for use as needed while nevertheless reducing the memory requirements for the scene graph.

In some embodiments, entire portions of the scene graph may be replaced by pointers. In other embodiments, only object information such as geometry and texture information may be replaced by pointers. In still other environments, different combinations of information from the scene graph may be replaced by pointers. Note, as time progresses, in some implementations the viewpoint for rendering portions of the scene graph may change. Similarly, the locations of objects within the scene graph may also change (e.g., if objects in the virtual world move). These changes may be taken into account, and the methods described above may be repeated for changing viewpoints and changing object positions. If a portion of the scene graph has been replaced by a pointer becomes relevant to either the current visibility threshold or the predicted future visibility threshold, that information may be read back and used to replace the pointer (or decompressed and then used to replace the pointer). Thus, in some embodiments the current viewpoint may be all that is needed to effectively manage the memory requirements of the scene graph. However, in other embodiments additional information such as the visibility frustum and predicted future locations and orientations of the viewpoint and visibility frustum may be utilized. Examples of additional information that may also be utilized include rendering and environmental parameters such as the amount of fogging and the distance to the visibility horizon.

As noted above, the methods described herein may be implemented as a computer software program, in hardware and software, or entirely in hardware. However, due to the flexibility of software solutions, a software implementation is preferable. The software may be implemented as part of an application programming interface (API), as part of graphics application, a browser, or as part of a graphics system driver.

BRIEF DESCRIPTION OF THE DRAWINGS

The foregoing, as well as other objects, features, and advantages of this invention may be more completely understood by reference to the following detailed description when read together with the accompanying drawings in which:

FIGS. 7 and 8 illustrate another embodiment of a method for data staging.

Figure 1:
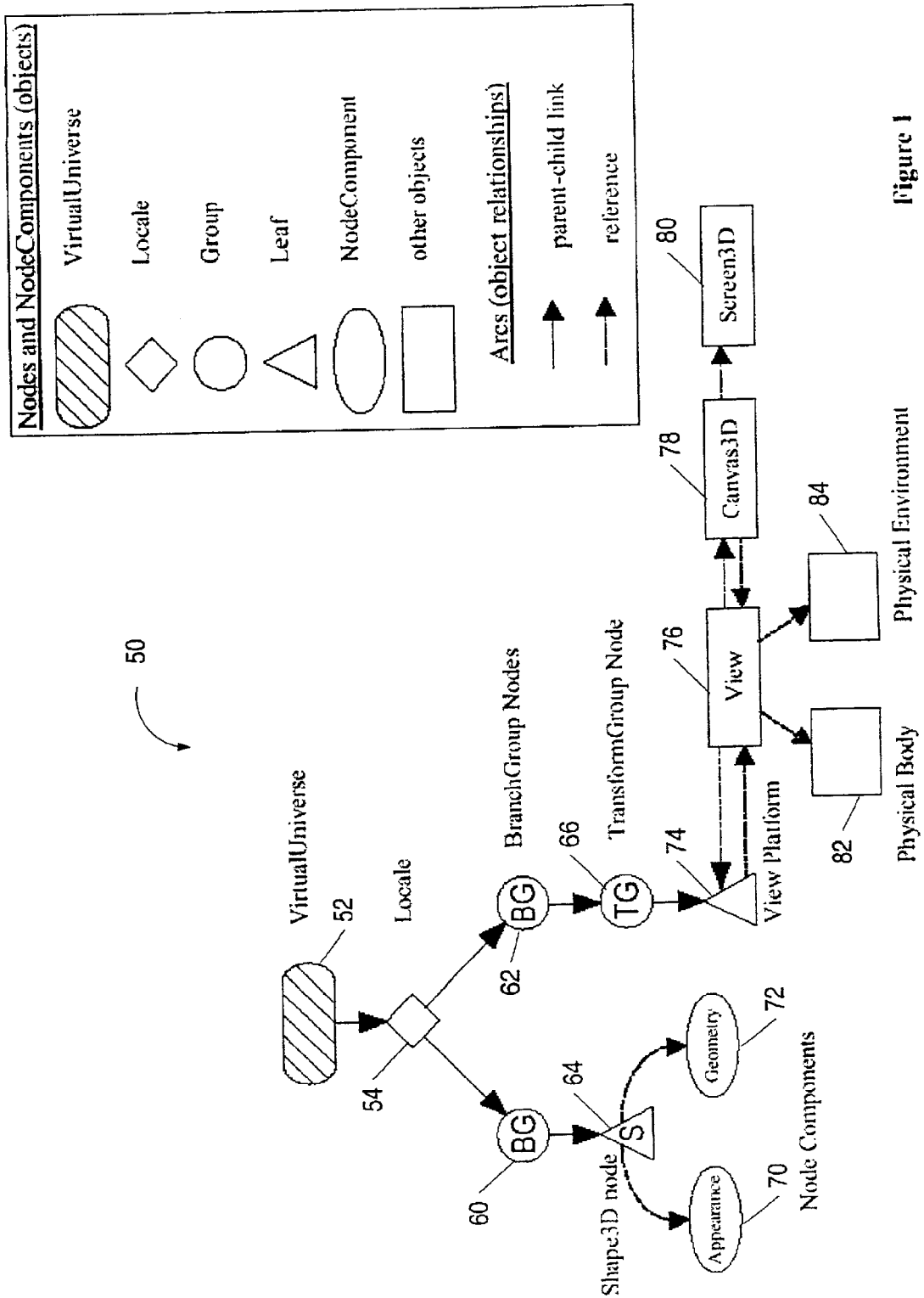
FIG. 1 illustrates one embodiment of a scene graph.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must).

DETAILED DESCRIPTION OF SEVERAL EMBODIMENTS

FIG. 1: Scene Graph

Turning now to FIG. 1, one embodiment of a scene graph 50 is shown. In this example, scene graph 50 is created from instances of Java 3D classes, but other types of scene graphs are also possible and contemplated (e.g., VRML scene graphs). Scene graph 50 is assembled from objects that define the geometry, sound, lights, location, orientation, and appearance of visual and non-visual objects (e.g., sounds) that are part of a 3D or virtual world.

As illustrated in the figure, scene graph 50 may be thought of as a data structure having nodes and arcs. A node represents a data element, and an arc represents the relationship between data elements. In the figure, nodes 54–66 and 74 of scene graph 50 are the instances of Java 3D classes. The arcs represent two types of relationships between the Java 3D class instances. The first type of relationship is a parent-child relationship. For example, in this embodiment a group node such as branch group node 60 can have any number of children (such as Shape3d leaf node 64), but only one parent (i.e., local node 54). Similarly, a leaf node has one parent but no children. These relationships are indicated in the figure by solid lines. The second type of relationship is a reference. A reference associates a particular node component object with a scene graph node. Node component objects define the geometry and appearance attributes used to render the visual objects. References are indicated in the figure by dashed lines.

As shown in the figure, Java 3D™ scene graph 50 is constructed of node objects in parent-child relationships forming a tree structure. In a tree structure, one node (e.g., VirtualUniverse node 52 in the figure) is the root. Other nodes are accessible by following arcs from the root. Scene graph 50 is formed from the trees rooted at locale object 54.

The node components and reference arcs are not part of the scene graph tree. Since only one path exists from the root of a tree to each of the leaves, there is only one path from the root of a scene graph to each leaf node. The path from the root of scene graph 50 to a specific leaf node is called the leaf node's "scene graph path." Since a scene graph path leads to exactly one leaf, there is one scene graph path for each leaf in the scene graph 50.

Each scene graph path in a Java 3D scene graph completely specifies the state information of its leaf. State information includes the location, orientation, and size of a visual object. Consequently, the visual attributes of each visual object depend only on its scene graph path. Embodiments that utilize the Java 3D renderer may take advantage of this fact and render the leaves in the order that the renderer determines to be most efficient. Since the Java 3D renderer typically controls much of the rendering process, the programmer normally does not have control over the rendering order of objects.

Graphic representations of a scene graph can serve as design tool and/or documentation for Java 3D programs. Scene graphs are drawn using standard graphic symbols as shown in FIG. 1. Note, however, that Java 3D programs may have many more objects than those of scene graph 50.

To design a Java 3D virtual universe, a scene graph is drawn using the standard set of symbols. After the design is complete, that scene graph drawing may be used as the specification for the program. After the program is complete, the same scene graph is a concise representation of the program (assuming the specification was followed). Thus, a scene graph drawn from an existing program documents the scene graph the program creates.

Figure 2:
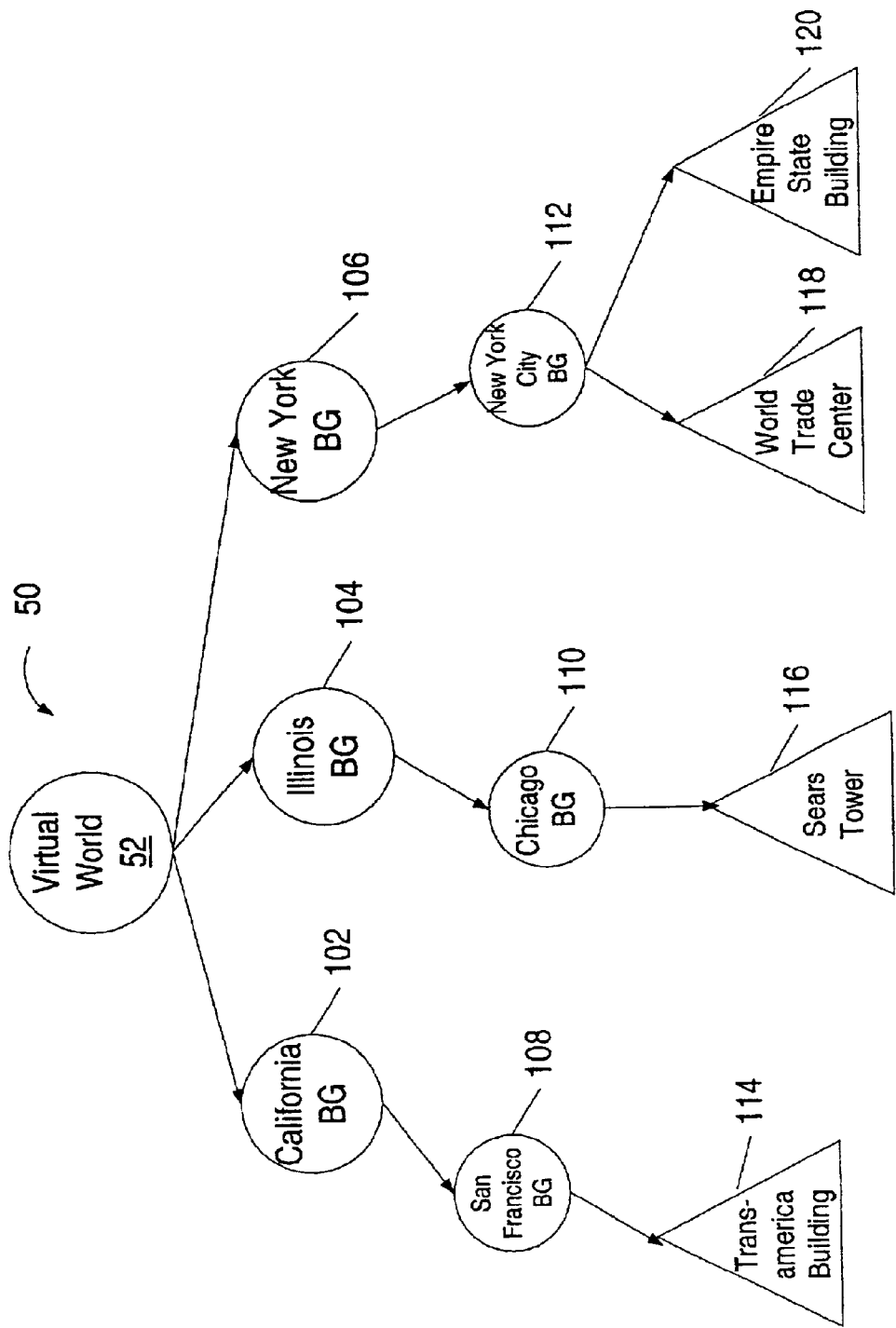
FIG. 2 illustrates one embodiment of a simplified scene graph.

Turning now to FIG. 2, one embodiment of a simplified scene graph 50 is shown. Scene graph 50 comprises virtual world 52, a plurality of group nodes (California branch group node 102, Illinois branch group node 104, New York branch group node 106, San Francisco branch group node 108, Chicago branch group node 110 and New York city branch group node 112), and a plurality of leaf nodes (Transamerica Building leaf node 114, Sears Tower leaf node 116, World Trade Center leaf node 118, and Empire State Building leaf node 120). This simplified scene graph 50 may be used to illustrate one method for managing large scene graphs as described in greater detail below.

Assuming scene graph 50 is too large to fit entirely within the memory of the computer system that is rendering the scene graph, then it may be advantageous to read only selected portions of scene graph 50 into memory. For example, assuming a viewer (for which virtual world 50 is being rendered) is positioned in virtual world 50 near the position of Transamerica Building 114 in San Francisco branch group 108, then it may unlikely or impossible that the viewer may be able to see the Sears Tower leaf node 116 or World Trade Center node 118 or Empire State Building 120. In many virtual reality applications, a limit may be placed on how far the viewer can "see" in the virtual world. This limit performs two important tasks. First, it attempts to mimic the effect that the earth's curvature and atmospheric attenuation have on visibility (i.e., obscuring objects beyond a particular maximum distance). Second, it reduces the number of computations that need to be performed to render a particular frame. For example, without a maximum distance, the rendering program would have to consider each object in the New York City branch group node 112 for possible rendering even if the viewer is in a room in the Transamerica building 114. A maximum distance allows the rendering program to more quickly discard objects that are effectively irrelevant to the current viewpoint.

The process of discarding objects may be supplemented by fogging and/or depth cueing, which attempts to blur or obscure objects as they recede from the viewer. Thus, a building that is close to the viewer's viewpoint may be rendered normally, while a building far off in the distance may be rendered with a strong blur effect or not at all. Given the environmental and rendering attributes of scene graph 50, it may be possible to selectively load portions of scene graph 50 into computer memory based on the position of the viewer or viewers in the virtual world. As the position of the viewer changes in virtual world 52, different portions of scene graph 50 may be loaded into memory and/or purged from memory. For example, as the viewer moves from a viewpoint within San Francisco branch group node 108 toward a position within the Chicago branch group node 110, leaf node 116 representing the Sears Tower may be loaded into memory and the leaf node 114 representing the Transamerica Building may be purged from memory (e.g., once the viewer has passed a certain threshold distance from the position of the Transamerica Building leaf node 114). Advantageously, this method may, in some embodiments, dramatically reduce the amount of memory required to manage large scene graphs such as scene graph 50. While scene graph 50 in the figure is simplified, the leaf nodes representing the different buildings may each account for several gigabytes of graphical data (e.g., millions of polygons and corresponding color and texture data).

Figure 3:
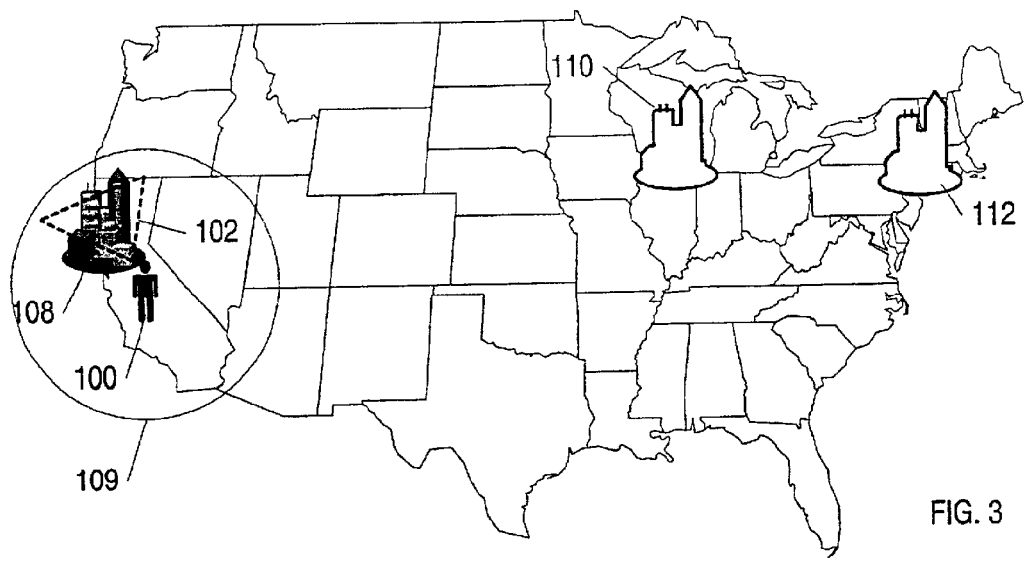
FIG. 3 illustrates one example of a virtual world.
Figure 4:
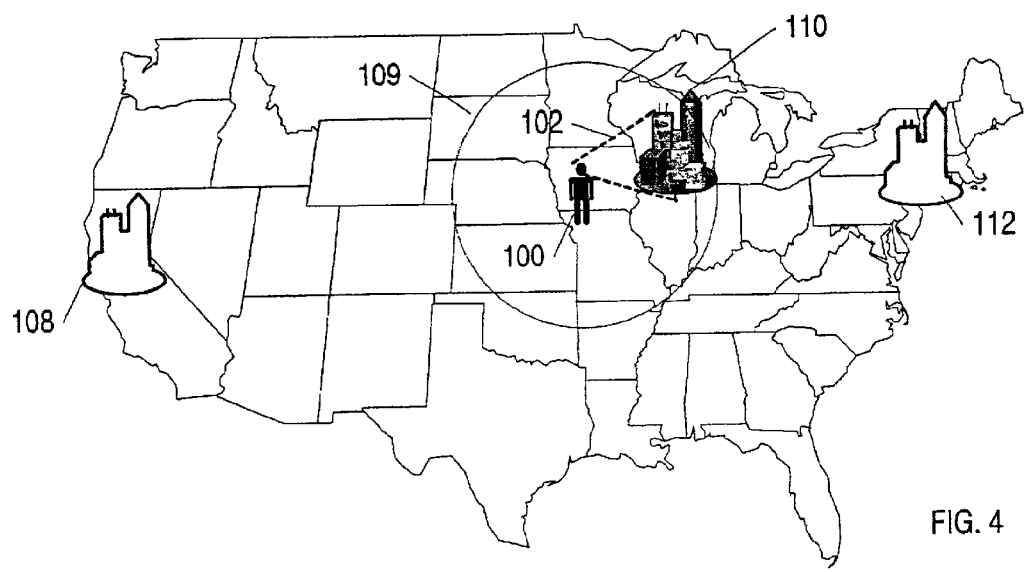
FIG. 4 illustrates the virtual world from FIG. 3 with a different viewpoint.

Turning now to FIGS. 3 and 4, one embodiment of the method described above is illustrated. In FIG. 3, a viewpoint 100, is positioned relatively close to San Francisco branch node group 108. Thus, the leaf nodes that are children of San Francisco branch node group 108 (e.g., Transamerica Building leaf node 114 from FIG. 2) are loaded into system memory. However, since the viewpoint 100 is relatively distant from Chicago branch group node 110 and New York branch group node 112, the leaf nodes that are children of those branch node groups are not loaded into memory.

In FIG. 4, a change in viewpoint 100 is illustrated. As shown in the figure, as viewpoint 100 moves from a position near branch group node 108 to a position near branch group node 110, the leaf nodes of branch group 108 may be purged from memory (i.e., replaced with a pointer), and the leaf nodes of branch group 110 may be read into memory. Portions of scene graph 50 that are purged or removed from memory may be handled in a number of different ways. For example, in one embodiment, a pointer may be placed within scene graph 50 and the data corresponding to the leaf node may be written/cached to slower memory (e.g., a local hard drive versus local RAM, or local storage server versus a local hard drive). This configuration may be particularly useful when the scene graph is initially loaded across a slow network. By locally caching the purged portions of scene graph 50, latency may potentially be reduced. In other embodiments having high speed network connections, (e.g., gigabit Ethernet connections and storage area networks), the purged portions of scene graph 50 need not be stored locally. Instead, the purged portions may simply be replaced with a pointer to the original source of the data (e.g., a remote data server). In another embodiment, the discarded portions of the scene graph may be compressed and then stored locally or remotely.

If the viewpoint 100 moves back to a position near San Francisco branch group node 108, then the graphics program that manages or renders the scene graph will detect the pointer as the scene graph is traversed. In response to detecting the pointer, the corresponding leaf nodes may once again be requested from the server that initially provided the leaf nodes or from the hard drive where the local copy of the leaf nodes are now stored (and decompressed, if necessary). Upon re-reading the leaf node data, the pointer may be removed from the scene graph 50 and replaced with the actual data, or the pointer may be updated to indicate the new local location of the data.

As shown in the figure, for a given position of viewpoint 100, there is a region of space or volume that is visible, as represented in the figure by triangle 102. This region visible from a particular viewpoint is typically referred to as a "view volume" or "view frustum". Note, while triangle 102 is two-dimensional in the figure, in actual rendering environments the view frustum is a three-dimensional pyramid or cone. Distance 104 represents the maximum viewable distance from viewpoint 100 thus, distance 104 represents the back clipping distance for viewing volume 102. In some embodiments, the back bounds of view frustum 102 may be linear as shown in the figure, but in other embodiments the back bounds of view frustum 102 may be curved (i.e., formed by rotating distance 104 around viewpoint 100).

Thus, as described above, a method for managing a large scene graph may be based on moving data from a local memory to higher latency and/or lower bandwidth memory based on the position of the viewpoint 100 and/or view frustum 100. However, in some cases if the viewpoint moves rapidly, the length of time that it takes to load the necessary objects may be unacceptable. Thus, a locality threshold volume or region 109 may be defined around the viewpoint and/or view frustum. Some form of hysteresis or fuzzy logic may also be employed for decision making for objects near the edges of locality threshold 109 to prevent thrashing (i.e., repeated loading and purging of data).

Figure 5:
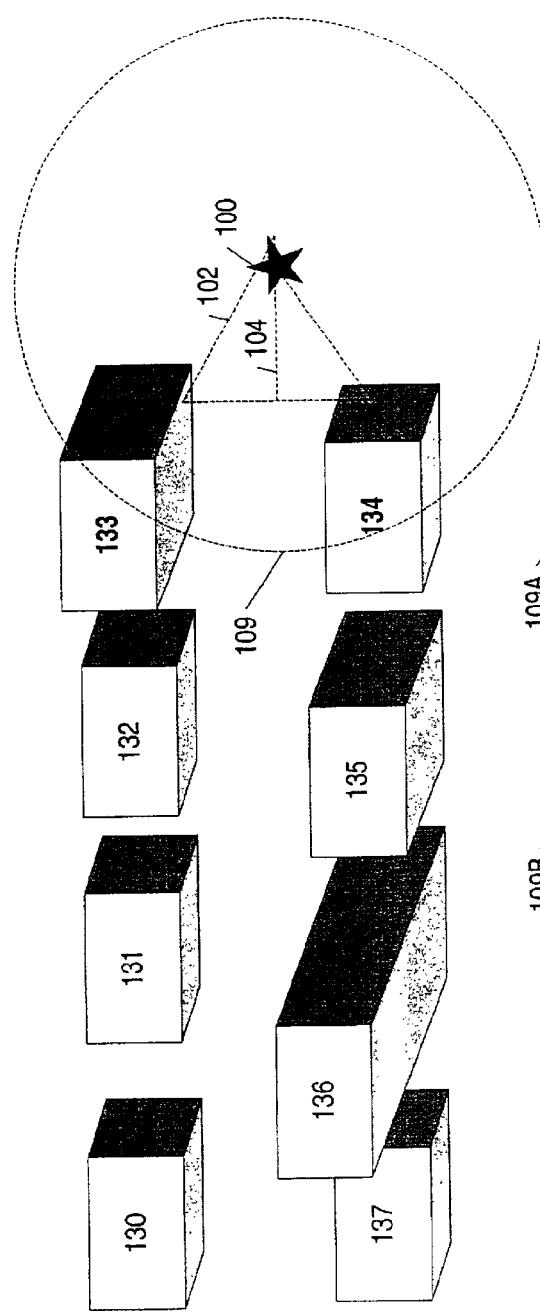
FIGS. 5 and 6 illustrate one embodiment of a method for data staging.
Figure 6:
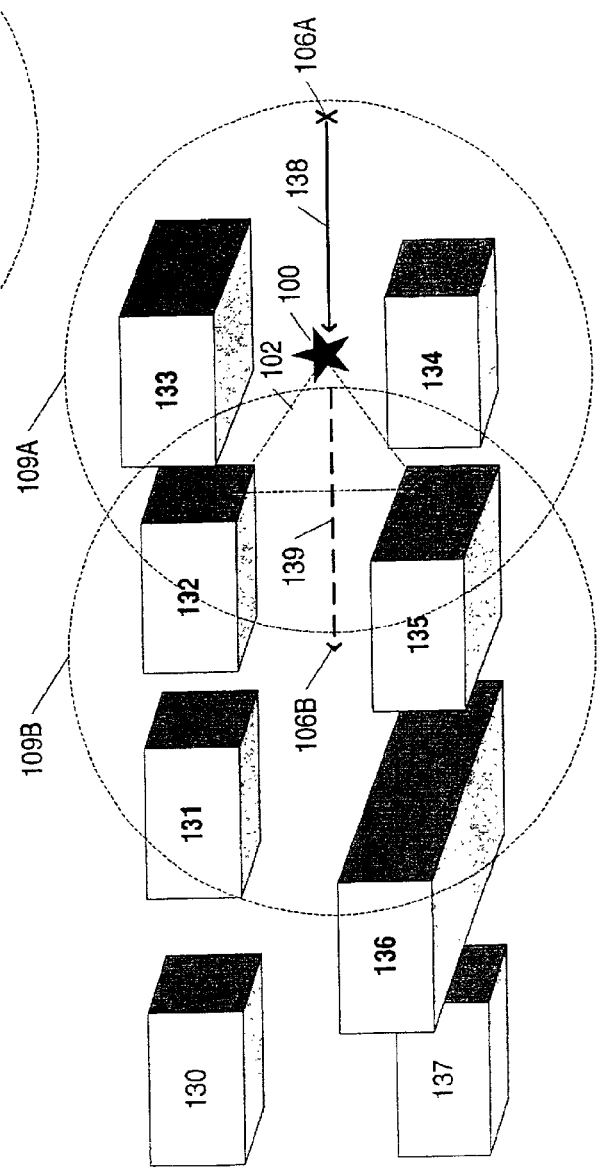

Turning now to FIGS. 5 and 6, another embodiment of the method for managing large scene graphs is shown. In this embodiment, viewpoint 100 is represented by a star, and the volume that is visible from the viewpoint that is visible from a viewpoint 100 is represented by triangle 102. FIG. 5 shows viewpoint 100 at an initial position with objects 133 and 134 partially within view volume 102 and locality threshold 109. Objects 130 through 132 and 135 through 137 are relatively distant from the bounds of view volume 102 and locality threshold 109. Assuming that the virtual world shown in the figure is defined using a scene graph, initially the leaf nodes corresponding to objects 133 and 134 may be stored in local memory, while the data corresponding to objects 130–132 and 135–137 may be replaced by pointers. Alternatively, if the scene graph comprises pointers, then the pointers pointing to objects 133 and 134 may be modified to point to local memory (and the corresponding data for objects 133 and 134 may stored there), and the pointers pointing to objects 130–132 and 135–137 may be modified (if necessary) to point to remote locations.

Turning now to FIG. 6, the example virtual world from FIG. 5 is shown, but viewpoint 100 has moved according to motion vector 138. Similarly, view volume 102 and locality threshold have also moved. Objects 131–132 and 135–136 are now partially within view volume 102, so the corresponding data may be loaded to local memory and the scene graph may be modified accordingly. If only view volume 102 is used, then the data corresponding to objects 133 and 134 may be discarded, compressed and/or written out to another location from local memory. This system may work well if objects 132 and 133 do not require much time to load and process (e.g., decompress). If, however, objects 132 and 133 require a significant amount of time to load or process in preparation for rendering, or if viewpoint 100 is moving rapidly through the virtual world, then it may be advantageous to pursue a more proactive or predictive approach.

For example, in some embodiments the motion of viewpoint 100 may be used to predict which leaf nodes or objects will be needed to render future frames. For example, based on the motion of viewpoint 100, a future position of viewpoint 100 may be projected (as shown in the figure by predicted motion vector 139). Based on the predicted future position of viewpoint 100, a future position of view volume 102 may also be predicted. This predicted view volume may then be used to determine which leaf nodes or objects should be read into local memory, and which leaf nodes are objects would be likely candidates for purging (i.e., replacement by pointers). Thus, motion vector 138 may be used to determine predicted motion vector 139, which in turn may be used to determine a predicted viewpoint position 106B. By placing view volume 102 at the predicted position 106B, a determination may be made as to which objects (e.g., leaf nodes) should be stored into memory and which objects or leaf nodes should be purged (i.e., replaced with a pointer). The time periods used for determining (i) how often to predict future viewpoint positions, and (ii) how often to determine which leaf nodes should be loaded or purged, may vary depending upon a number of factors. The factors may include, for example, the complexity and size of the scene graph, the maximum possible velocity of the viewpoint, the amount of memory present in the system, and the processing speed and memory band width of the system.

Turning now to FIGS. 7 and 8, yet another example of the method described above is shown. In this example, viewpoint 100's relative position to graphical objects 140 through 154 does not change. However, the orientation of view volume 102 relative to viewpoint position 100 changes. FIG. 7 illustrates the position of view volume 102 at a time T=0. In this position, graphical object 140 is visible within view volume 102, while objects 142 through 154 are not visible because they are outside of view volume 102. As shown in the figure, at least object 140 would be loaded into memory at T=0. Turning now to FIG. 8, the same scene is shown at a time T=1. At this time, view volume 102 has rotated around viewpoint position 100. As a result, object 140 is no longer within view volume 102, but object 142 is (at least partially). Based on the angular velocity of view volume 102 relative to viewpoint 100, a future orientation for view volume 102 may be predicted. Based on this predicted orientation, a determination of which leaf nodes should be loaded into memory and which nodes should be purged may be made. Thus, in addition to loading leaf node 142, leaf node 144 and possibly leaf node 146 may also be loaded based on the angular velocity of view volume 102. Similarly, if view volume 102 has a large angular velocity (as indicated by arc 104), then leaf node 140 may be purged from memory and replaced with a pointer. Note, as used herein the term "purged" refers to the removal of a particular node or object from a local memory and either replacing the node or object in the scene graph with a pointer or redirecting the pointer already present in the scene graph. As noted above, the removed node or object may be cached to a local hard drive or other storage system in compressed or uncompressed form, or it may be deleted and then reloaded from a network connection.

As described in the figures above, the velocity (both linear and angular) of the viewpoint and view volume may be used to determine a predicted viewpoint position and view volume orientation. However, in some embodiments additional parameters may also be used to determine the projected position and orientation of view volume 102. For example, acceleration in addition to velocity may be used (both linear and angular). Other factors may also be used. In some embodiments, the angle of view volume 102 may be changed (e.g., as part of a zoom in or zoom out effect). Changes in this angle may also be taken into account (and also rates of changes and acceleration of rates of changes in this angle). Other variables may also be considered as part of determining which scene graph nodes to load and/or purge. For example, changes in transform group nodes within the scene graph may effect which leaf nodes are within the future predicted position and orientation of view volume 102. For example, while the view volume may be moving in a linear direction away from a particular object, the object may in turn be moving toward the view volume at a higher rate of speed. Thus, in order to effectively predict which leaf nodes may be necessary, changes to transform group nodes may also be considered. However, in large complex systems where significant distances between branch group nodes exist, these additional factors may sometimes be ignored in order to simplify the prediction. In addition, while the examples presented in the figures and described herein have shown circular or spherical locality thresholds, other shapes (e.g., squares, rectangles, or cubes) may be used to simplify calculations. Furthermore, the locality threshold need not be centered at the current viewpoint. This method may also be applied to non-visible objects (e.g., such as objects that generate sound) or objects that comprise code that need only be executed once the viewpoint is within a specified distance of the a predetermined position in the virtual world.

Figure 9:
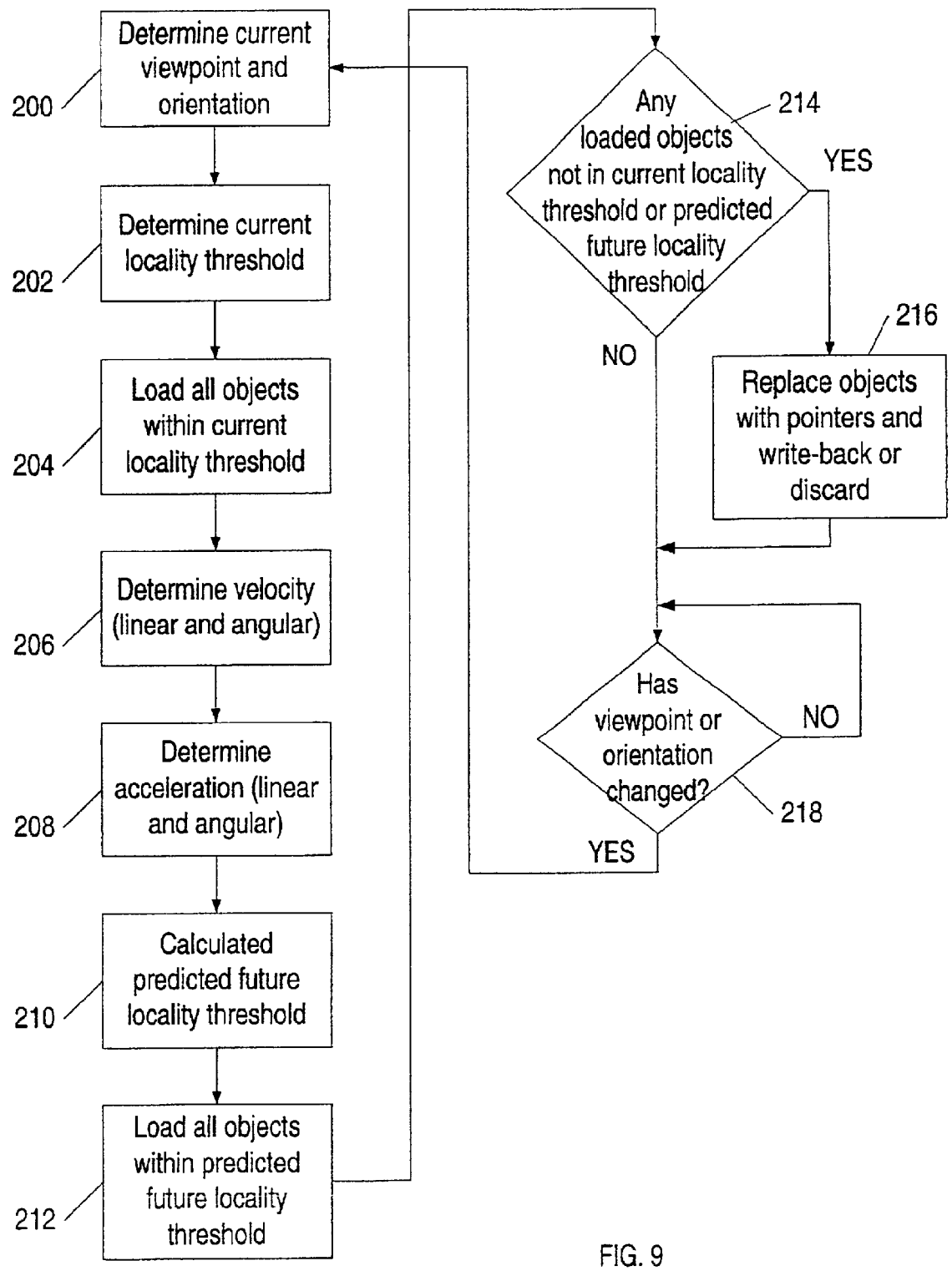
FIG. 9 is a flowchart illustrating one embodiment of a method for data staging.

Turning now to FIG. 9, a flow chart of one embodiment of the method for managing large scene graphs described above is shown. First, the current viewpoint and orientation of the viewpoint is determined (step 200). Next, a locality threshold is determined (step 202). The locality threshold may be used to determine which objects should be loaded or should be removed from memory. Note, in some configurations, objects outside the current locality threshold or viewpoint may simply be tagged as a good choice for purging, but purging itself may only be triggered if available memory reaches a predetermined level of scarcity. Next, all objects within current view volume and current locality threshold are loaded into memory (step 204). As previously noted, this may be accomplished by requesting the geometry and appearance data for objects via a network or from a local hard drive. Next, a velocity (both linear and angular) is determined for the view volume and view volume orientation (step 206). Similarly, a value for acceleration (both linear and angular) may be calculated (step 208). Based on the previously calculated velocity and acceleration values, a predicted future locality threshold may be determined (step 210). The scene graph may then be compared with the predicted future locality thresholds, and any objects that at least partially fall within the view predicted future locality threshold that are not already in memory may be loaded into memory (step 212). Next, any objects in memory that are not within the current locality threshold or a predicted future locality threshold may be detected (step 214). If there are such objects, they may be replaced in the scene graph with pointers (step 216). As previously noted, in some cases the objects may be moved to a slower local storage (e.g., a local hard drive), or they may be compressed or discarded entirely and reloaded from a network or other device (e.g., a local CD ROM and DVD ROM) at a later time. Changes in the current viewpoint for orientation of the view volume are detected (step 218). If any such changes are detected, the entire process may be repeated. The method described in the figure may be implemented in software (e.g., as part of a browser plug-in, graphics application, or API such as JAVA 3D™) or in a combination of hardware and software (e.g., as part of a graphics system). Note, the flow chart depicted in the figure is merely an example of one embodiment, and other embodiments are possible and contemplated. For example, some of the steps in the figure may be performed in parallel or in different order, and other steps may be added or removed.

Thus, the methods described above may be particularly useful in reducing memory requirements for large scene graphs (i.e., object hierarchies). At any point in the object hierarchy, a pointer may be inserted in lieu of actually storing that part of the scene graph in memory. As described above, which parts of the scene graph are stored in memory, and which parts are replaced with pointers, may be determined based on locality and clustering. For example, an object hierarchy may describe the entire United States (i.e., a very large bounding hull) with children Illinois, New York, and California (with medium bounding hulls), and with grandchildren San Jose, San Francisco, Los Angeles, Chicago, and New York City (with smaller bounding hulls). When a viewer is in the San Jose locality, children Illinois and California may be replaced with pointers, thus requiring less memory. As the viewer (i.e., viewpoint) moves across the virtual world in an easterly direction, Illinois may be loaded into memory (e.g., with Chicago) and California (with San Jose, San Francisco, and Los Angeles) may be replaced by a pointer. In some embodiments, a fixed distance may be used to determine which leaf nodes in the tree (i.e., which objects in the hierarchy) are to be stored in memory. This process can be predicted based on velocity and acceleration. Another factor that may also be used is the determination is the visibility horizon (i.e., how far the viewer can see in the environments of the virtual world). Thus, portions of the scene graph that are not relevant within the current locality threshold are replaced (i.e., purged from memory). As used herein, a graphical object is "relevant" to a current locality threshold or view frustum if the object is at least partially visible or has any visible influence on any object that is at least partially visible in the current locality threshold or view frustum. Similarly, an auditory object is relevant if the object is audible from the current position in the current view frustum or locality threshold.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for managing a scene graph, the method comprising:

determining a current location for a viewpoint;

determining a current locality threshold based on at least the current location of the viewpoint;

determining which portions of the scene graph are relevant to the current locality threshold;

loading into a local memory those portions of the scene graph that are relevant within the current locality threshold;

replacing portions of the scene graph that are not relevant within the current locality threshold with one or more pointers, wherein the pointers indicate where the replaced portions may be loaded from if the replaced portions are needed;

determining a predicted future locality threshold; and loading into the local memory those portions of the scene graph that are relevant within the predicted future locality threshold, wherein said replacing is performed only on portions of the scene graph that are not relevant within (i) the current locality threshold and (ii) the predicted future locality threshold.

2. The method of claim 1, further comprising:
   determining a current velocity for the viewpoint, wherein the predicted future locality threshold is determined based on at least the current location for the viewpoint and the current velocity of the viewpoint.

3. The method of claim 2, wherein said velocity comprises both translational and rotational components.

4. The method of claim 2, further comprising:
   determining a current acceleration for the viewpoint, wherein the predicted future locality threshold is determined based on at least the following:
   the current location for the viewpoint,
   the current velocity of the viewpoint, and
   the current acceleration of the viewpoint.

5. The method of claim 4, wherein said acceleration comprises both translational and rotational components.

6. The method of claim 2, further comprising:
   determining a current orientation for the viewpoint, wherein the predicted future locality threshold is determined based on at least the following:
   the current location for the viewpoint,
   the current velocity of the viewpoint, and
   the current orientation of the viewpoint.

7. The method of claim 2, further comprising caching the replaced portions of the scene graph to a local hard drive, wherein the pointers point the replaced portions on the local hard drive.

8. The method of claim 2, wherein the pointers point to network locations from which the replaced portions of the scene graph may be loaded.

9. The method of claim 2, further comprising:
   compressing the replaced portions of the scene graph; and
   storing the compressed portions of the scene graph, wherein the pointers indicate where the compression portions of the scene graph are stored.

10. The method of claim 1, wherein said replacing is performed only once a predetermined level of memory utilization is reached.

11. The method of claim 1, wherein said replacing employs hysteresis to prevent thrashing.

12. The method of claim 1, wherein said determining which portions of the scene graph are relevant within the current locality threshold comprises determining which of the objects in the scene graph are visible from the current viewpoint location.

13. The method of claim 1, wherein the replaced portions of the scene graph correspond to objects in the scene graph that are not visible from the current viewpoint location.

14. A computer program embodied on a computer-readable medium, wherein the computer program comprises a plurality of instructions that are executable to:
   determine a current location for a viewpoint;
   determine a current locality threshold based on at least the current location of the viewpoint;
   determine which portions of the scene graph are relevant to the current locality threshold;
   load into a local memory those portions of the scene graph that are relevant within the current locality threshold;
   replace portions of the scene graph that are not relevant within the current locality threshold with one or more pointers, wherein the pointers indicate where the replaced portions may be loaded from if the replaced portions are needed;
   determine a predicted future locality threshold; and
   load into the local memory those portions of the scene graph that are relevant within the predicted future locality threshold, wherein said replace is performed only on portions of the scene graph that are not relevant within (i) the current locality threshold and (ii) the predicted future locality threshold.

15. The computer program of claim 14, wherein the instructions are further executable to:
   determine a current acceleration of the viewpoint; and
   use at least the acceleration value to determine the predicted future locality threshold.

16. The computer program of claim 14, wherein the instructions are further executable to: render one or more frames based on the scene graph.

17. The computer program of claim 14, wherein the instructions are further executable to: receive user input regarding movement of the viewpoint.

18. The computer program of claim 14, wherein the computer program is an application programming interface (API).

19. The computer program of claim 14, wherein the computer program is a graphics application.

20. A method for managing a scene graph comprising a plurality of pointers, the method comprising:
   determining a current location for a viewpoint;
   determining a current locality threshold based on at least the current location of the viewpoint;
   determining which of the pointers point to data that is relevant to the current locality threshold;
   loading into a local memory the data that is relevant to the current locality threshold;
   moving any data that is not relevant to the current locality threshold from the local memory to a new location;
   redirecting pointers in the scene graph that correspond to the moved data to point to the new location;
   determining a predicted future locality threshold; and
   loading into the local memory those portions of the scene graph that are relevant within the predicted future locality threshold, wherein said redirecting is performed only on pointers in the scene graph that are not relevant to the current locality threshold and the predicted future locality threshold.

21. The method of claim 20, wherein the current locality threshold equals a current view frustum.

22. The method of claim 20, wherein the moving is only performed if the local memory reaches a predetermined level of fullness.

23. The method of claim 20, wherein said moving any data is performed only on data that is not relevant to both the predicted future locality threshold and the current locality threshold.

* * * * *